Mar. 6, 1923.

T. T. FULTZ 1,447,539

HITCH

Filed June 18, 1921

Fig. 1.

Fig. 2.

Inventor
T. T. Fultz
By Watson E. Coleman
Attorney

Patented Mar. 6, 1923.

1,447,539

UNITED STATES PATENT OFFICE.

THOMAS T. FULTZ, OF OSNABROCK, NORTH DAKOTA.

HITCH.

Application filed June 18, 1921. Serial No. 478,733.

*To all whom it may concern:*

Be it known that I, THOMAS T. FULTZ, a citizen of the United States, residing at Osnabrock, in the county of Cavalier and State of North Dakota, have invented certain new and useful Improvements in Hitches, of which the following is a specification, reference being had to the accompanying drawings.

This invention relates to certain improvements in hitches and has relation more particularly to a device of this general character especially designed and adapted for use in connection with tractors, and it is an object of the invention to provide a device of this general character having novel and improved means whereby a farming implement, such as a harrow or other machine, may be coupled to a tractor in a convenient and effective manner.

The invention consists in the details of construction and in the combination and arrangement of the several parts of my improved hitch whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein;

Figure 1 is a view in top plan of a hitch constructed in accordance with an embodiment of my invention, the coacting portions of a tractor and a farm implement being diagrammatically indicated by dotted lines, and Figure 2 is a view in top plan and partly in section showing the device in a second position.

As disclosed in the accompanying drawings, 1 denotes a draw bar of desired length and which is provided in its opposite end portions with a series of longitudinally spaced openings 2 whereby the clips or clevises 3 may be adjustably engaged with the bar 1 in accordance with the size of the implement or machine with which the hitch is to be employed.

Freely engaged with each of the clips or clevises 3 is an annular member or ring 4. Also loosely engaged with the member or ring 4 is an end portion of a rod 5, the opposite end portion of said rod being freely engaged with an annular member or ring 6. The rings 6 are adapted to have coupled therewith the rods 7 or the like which are adapted to be connected to the opposite end portions of the harrow or kindred implement or machine so that when my improved hitch is in use the possibility of such implement or machine turning around endwise with respect to the tractor is substantially eliminated.

The members or rings 4 also have freely engaged therewith end portions of the inwardly directed rods 8, the inner or opposed end portions of said rods 8 being tied or connected by a flexible member 9, preferably a link chain. This member or chain 9, in practice, is engaged from the rear with a pulley 10 or kindred member suitably anchored to the central portion of the harrow, or kindred implement or machine. By this means the center draft or load is transmitted to the opposite end portions of the draw bar 1.

Extending forwardly from the draw bar 1, at the central portion thereof, are the beams or arms 11. These arms 11 are in crossed relation and the forward or outer end portions thereof are adapted to be coupled to the rear portion of a tractor in any ordinary or preferred manner. The arms 11 are substantially of equal length, and the inner portions of said arms are secured, as at 12, to the draw bar 1 at points at opposite sides of the longitudinal center of the bar 1 and equi-distantly spaced therefrom. The overlying or lapping portions of the arms 11 are preferably forwardly of the longitudinal center of the distance between the central part of the bar 1 and the portion of the tractor to which said arms 11 are coupled.

This particular mounting or arrangement of the arms 11 provide effective means to prevent the bar 1 from drawing or turning sideways and which movement would otherwise have a tendency to contact with or catch in the rear or drive wheels of the associated tractor. This action is materially facilitated in view of the fact that the rings 4, 5, 6 and 7 at the opposite end portions of the bar 1 afford connections with the harrow or the like which at all times are in parallelism when pull is imposed upon the bar 1.

14 denotes a supplemental beam or arm which normally serves as a brace. This arm 14 extends forwardly from the draw bar 1 and substantially at right angles thereto with the forward end portion of the arm 14 terminating in substantially the same plane occupied by the outer or free ends of the arms 11. This arm underlies the overlapping portions of the arms 11 and is suitably secured to said overlapping portions by the bolts 15, or the like. The inner end portion of the beam or arm 14 is secured as at 16, by a bolt or the like, to the longitudinal central portion of the draw bar 1. The arm or beam 14 also extends a slight distance rearwardly of the bar 1 and said rearwardly extended portion 17 has an opening 18 to provide means whereby my improved hitch may be coupled to any implement or machine which is wheel supported, such a binder, disc plow, and the like. The forward end portion of the supplemental or brace arm 14 is also adapted to be coupled to the tractor.

From the foregoing description it is thought to be obvious that a hitch constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A tractor hitch comprising a draw bar, means carried thereby for coupling the central portion of the bar to a tractor, said means holding the bar against swinging movement independently of the tractor, flexible elements engaged with the opposite end portions of the bar and adapted for connection with the object to be coupled to the tractor, said elements providing connections in parallelism at all times when pull is imposed upon the bar, a member connected to the object coupled to the tractor at a point midway of the attachment of the connections with said object, rods secured to said connections at a point closely adjacent to the draw bar, and a flexible member connecting said rods and having sliding engagement with the member secured to the object.

2. A tractor hitch comprising a draw bar, means carried thereby for coupling the central portion of the bar to a tractor, said means holding the bar against swinging movement independently of the tractor, flexible elements engaged with the opposite end portions of the bar and adapted for connection with the object to be coupled to the tractor, said elements providing connections in parallelism at all times when pull is imposed upon the bar, a member connected to the object coupled to the tractor at a point midway of the attachment of the connections with said object, rods secured to said connections at a point closely adjacent to the draw bar, a flexible member connecting said rods and having sliding engagement with the member secured to the object, the connections between the end portions of the draw bar and the object being articulated.

In testimony whereof I hereunto affix my signature.

THOMAS T. FULTZ.